Figure 1:
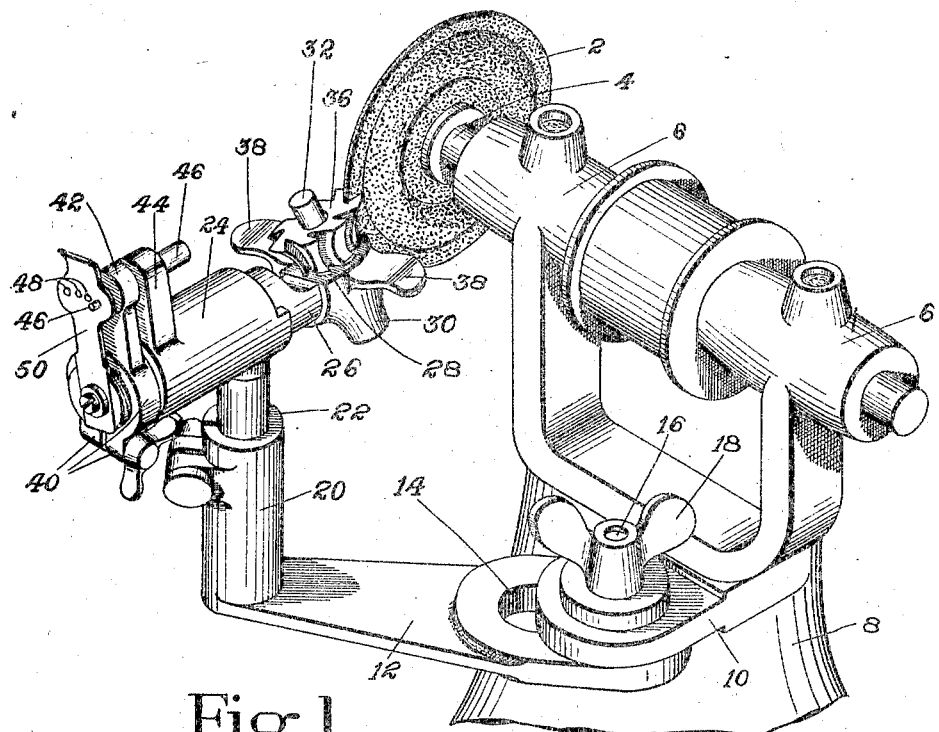

A. LATHAM.
GRINDING MACHINE.
APPLICATION FILED AUG. 19, 1916.

1,290,248.

Patented Jan. 7, 1919.

INVENTOR.
Albert Latham

UNITED STATES PATENT OFFICE.

ALBERT LATHAM, OF BEVERLY, MASSACHUSETTS, ASSIGNOR, BY MESNE ASSIGNMENTS, TO UNITED SHOE MACHINERY CORPORATION, OF PATERSON, NEW JERSEY, A CORPORATION OF NEW JERSEY.

GRINDING-MACHINE.

1,290,248.     Specification of Letters Patent.     Patented Jan. 7, 1919.

Application filed August 19, 1916. Serial No. 115,841.

*To all whom it may concern:*

Be it known that I, ALBERT LATHAM, a citizen of the United States, residing at Beverly, in the county of Essex and State of Massachusetts, have invented certain Improvements in Grinding-Machines, of which the following description, in connection with the accompanying drawings, is a specification, like reference characters on the drawings indicating like parts in the several figures.

This invention relates to means for grinding or sharpening the teeth of rotary cutters such, for example, as are used in trimming the edges of soles in the process of making boots and shoes. The invention is more particularly concerned with a construction of grinding device embodying improved means for holding the cutter head upon its support and means constructed and arranged for adjustment properly to position and present to the grinder the faces of teeth of different cutter heads which faces are disposed at different angles to the end face of the cutter head.

A cutter head of the described type is shown in my United States Letters Patent No. 1,104,910, granted July 28, 1914 and provides a plurality of teeth in circumferential series, with the front face of each tooth forming an acute angle with a radial plane of the cutter and with the cutting edge of each tooth comprising portions lying at different radial distances from the axis of the cutter. These front faces of the teeth must be ground to sharpen the cutting edges of the head and must be properly positioned and held relatively to the grinder in order to secure satisfactory results.

A feature of the present invention consists in the combination of a grinding member, a support, a slide mounted on said support for lengthwise reciprocating movement toward and from said grinding member and for angular adjustment on said support about its longitudinal axis, and having a seat thereon to support a cutter.

Preferably, the longitudinal axis of the slide and the plane of the cutter seat are in substantial alinement. By this arrangement angular adjustment of the cutter face to be ground is about an axis substantially coincident with the line of intersection of the plane of the front face of a tooth and the plane of the smaller end face of the cutter. This relation arises from the fact that in cutters of the type referred to, different cutters may present differences in diameter at their larger ends, involving differences in the angle between the plane of the front face of the tooth and the plane of an end face of the cutter but they are uniform in shape and diameter at their smaller ends, and in the different cutters the line of intersection of the plane of the front face of a tooth and the plane of the smaller end face of the cutter (on which line the end of the cutting edge of the tooth at the smaller end of the cutter rests) is at a uniform distance from the axis of the cutter. The described provision for angular adjustment about an axis substantially coincident with this line of intersection, obviates the necessity for additional adjustment with cutters having such different diameters at their larger ends and different angles.

Accordingly a further feature of the invention consists in the combination with a grinding member, of a support, a slide mounted on said support for lengthwise sliding movement toward and from said grinding member and having a cutter seat thereon in a plane in substantial alinement with the longitudinal axis of the slide, means angularly to adjust said slide about its longitudinal axis, and means to maintain said slide in its angularly adjusted position during lengthwise reciprocating movement. Preferably, the adjusting means will have suitable indicia for each adjustment afforded that may refer to the specific size or number of the cutter for which the particular adjustment is intended.

A further feature of the invention consists, in combination, with a grinder, a cutter-carrying member supported adjacent to the grinder and having a flat cutter seat thereon inclined relatively to the longitudinal axis of said member, with a cutter receiving pin of uniform diameter extending upwardly from said seat substantially perpendicular to said longitudinal axis, with means to effect relative movement of the grinder and cutter-carrying member in a direction to engage a supported cutter with the grinder. The cutter receiving pin is of a diameter to coincide with the diameter of the cutter bore at the smaller end of the cutter. Cutters of the type described are tapering in form and have a centrally located tapering bore smallest at the smaller end face of the cutter which is designed to rest on said cutter seat. The bore at this smaller end is of the same diameter with all sizes of cutters and since the cutter seat is inclined relatively to the longitudinal axis of the cutter-carrying member with the holding pin extending substantially perpendicular to said axis, the pin will be wedged against the lower edges of the cutter bore and will have a substantial bearing against one side face of the bore. The cutter is consequently held firmly on its seat and cannot "chatter" or otherwise move to interfere with adjustment and efficient operation.

These and other features of the invention including certain details of construction and combinations of parts, will now be described with reference to the accompanying drawings and pointed out in the claims.

Figure 2:
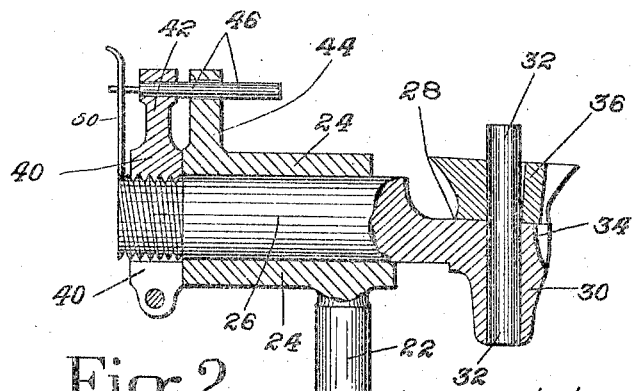

In the drawings:

Figure 1 is a view, in perspective, of a grinding device embodying the invention, and Fig. 2 is a longitudinal section through the support, and cutter-carrying slide with a cutter positioned on its seat.

In the illustrated device an emery wheel 2 is mounted upon a shaft 4 supported for rotation in bearings 6 carried by an upright standard 8. This standard, as shown, is adapted to be secured to a suitable bench or other substantially rigid support, but obviously it may form a portion of the frame of an edge trimming machine in which rotary cutters are employed.

A bracket 12 is mounted on a lug 10 of the standard 8, and extends in the direction of the emery wheel. This bracket is provided with a longitudinal slot 14 and is adjustably secured to the lug 10 by a bolt 16 extending through the slot 14 and through a bore in the lug, and engaged at its upper end by a wing nut 18. The bracket obviously is adjustable about the axis of bolt 16, and in addition is longitudinally adjustable within the limits of slot 14, so that the position of the outer end of the bracket and the parts carried thereby may be varied relatively to the grinding member 2.

The outer end of the bracket is provided with an upwardly extending split sleeve 20 in which is mounted, with means for both vertical and angular adjustment, the shank 22 of a horizontal support in the form of a bearing sleeve 24 adjustably positioned by the described means to extend in the direction of and in substantial alinement with the edge of the grinding wheel 2. In this sleeve, there is mounted for longitudinal sliding and axial turning movement, a slide or guide member 26 which, as shown, is circular in cross-section. The extremity of the slide adjacent to the emery wheel is cut down to form a flat cutter seat 28 inclining slightly from the plane of longitudinal movement of the slide and substantially in a plane coincident with the longitudinal axis of the slide, which axis, as previously stated, corresponds with the line of intersection of the plane of the front face of the tooth and the plane of the smaller end face of the cutter. The slide adjacent to the inner end of the cutter seat 28 is enlarged to provide an annular abutment flange to engage the sleeve 24 and limit lengthwise movement of the slide in one direction, and to form a depending boss 30 into which the lower end of a cutter-holding pin extends, the upper end of the pin extending upwardly from the cutter seat 28 and substantially perpendicularly to the longitudinal axis of the slide. This pin serves to hold the cutter 36 in position during grinding and the boss 30 is designed to provide a long bearing for the pin which will take the strain of grinding and prevent the pin from bending or breaking. A notch 34 is formed in the end of the slide below the cutter seat to afford clearance for the edge of the emery wheel and as an aid in positioning the cutter on its seat and relative to the grinding face of the emery wheel. In moving the slide toward the emery wheel, the operator's thumbs are pressed upon the cutter while the fingers engage projections 38 extending laterally from slide 26 at opposite sides of the supporting pin 32.

The diameter of the pin 32 is equal to the diameter of the bore at the smaller ends of the tapering cutters of the type described, which as previously stated, is the same for all sizes of cutters of this type. The smaller end face of the cutter 36 rests on the inclined seat 28 so that the cutter is slightly tilted relative to the pin 32 throwing the side wall of the cutter bore remote from the emery wheel uniformly against the pin and causing the cutter to wedge on the pin at the lower edges of the bore, as seen in Fig. 2. This construction insures that the cutter will not be tipped when it engages the emery wheel, with the consequent danger of breaking the fine randing teeth.

The outer end of the slide 26 or that end remote from the emery wheel is threaded and extends out beyond the adjacent end of the journal support 24 when the slide is moved inwardly toward the emery wheel. Inward movement of the slide 26 or movement toward the grinding wheel is limited by a split sleeve 40 interiorly threaded and clamped to the threaded outer end of the slide. This sleeve carries an upwardly extending guiding finger 42 having a bore therethrough alined with a similar bore in a lug 44 upstanding from the journal support 24 at its outer end.

A guide pin 46 extends through these alined bores and has its outer end reduced in diameter snugly to fit in an arcuate series of holes formed in the upper end of an arm 50 rigidly secured to the face of the outer extremity of slide 26 and extending radially therefrom, and forming a means for turning the slide about its longitudinal axis, angularly to adjust the slide and cutter tooth face.

Preferably, the arm 50 will bind on the reduced end of the guide pin 46 when the latter is inserted so that when the slide 26 moves inwardly and outwardly, the pin 46 will move with the arm 50 and guide finger 42 and relatively to the stationary guide lug 44. The guide pin will be of sufficient length with respect to the extent of lengthwise movement of the slide always to extend through the bore of lug 44 and will retain the guide finger 42 in the same position relative to the lug when its sleeve 40 is unclamped from the threaded end of slide 26.

Suitable indication marks will appear adjacent to each hole 48 since, by unclamping sleeve 40 and withdrawing pin 46 from engagement with the arm 50, the latter may be turned determinately to adjust the slide 26 about its longitudinal axis to present to the grinding surface at different angles, the face of the cutter tooth to be ground, when variance occurs in the angle between the plane of the front face of the tooth and the plane of the smaller end face of the cutter as previously described. When the desired adjustment is effected, the holes 48 and the pin 46 acting as gages, the pin 46 is moved by hand into the desired hole 48 and the split sleeve 40 is again clamped to the slide.

These indication marks adjacent to the adjustment holes 48 may and preferably will refer to the size or other distinguishing data of the cutter for which the adjustment is particularly designed so that the margin for error on the part of the operator is minimized.

In the light of the preceding description, it should be evident that, in operation, the necessary angular adjustment having been made as previously described, the operator grasps the projections 38 with the fingers of his two hands, pressing his thumbs downwardly on the cutter, and then moves the slide 26 toward and from the grinding wheel until the particular tooth face is sufficiently ground down; then the cutter is lifted from its seat and turned until its notch coincides with the clearance notch 34 and then is moved down on the pin 32 and against its seat, and the slide 26 again moved toward and from the cutter.

Having thus described my invention, what I claim as new and desire to secure by Letters Patent of the United States is;—

1. A device of the class described having, in combination, a grinding member, a bearing, a slide having a cutter seat thereon supported and guided by said bearing for lengthwise reciprocating movement toward and from said grinding member and for angular movement on said bearing about the longitudinal axis of the slide, means to secure determinate angular adjustment of the slide on said bearing, and means to maintain such adjustment during reciprocating movement of the slide.

2. A device of the class described having, in combination, a grinding member, a bearing sleeve, a slide having a cutter seat thereon mounted in and guided by said sleeve for lengthwise reciprocating movement toward and from the grinding member and for turning movement in said bearing sleeve to adjust the slide angularly about its longitudinal axis, means to effect turning movement of said slide in said sleeve determinately to adjust the slide about its longitudinal axis, and means to maintain the slide in its angularly adjusted position during the reciprocating movement of the slide.

3. A device of the class described having, in combination, a grinding member, a support, a slide mounted on said support for lengthwise sliding movement toward and from said grinding member and having a cutter seat thereon in a plane substantially alined with the longitudinal axis of the slide, means angularly and determinately to adjust said slide about its longitudinal axis, and means to maintain the slide in its angularly adjusted position during lengthwise reciprocating movement of the slide.

4. A device of the class described having, in combination, a grinding member, a bearing sleeve, a slide mounted in said sleeve for lengthwise reciprocation toward and from the grinding member and for turning movement angularly to adjust the slide about its longitudinal axis, and having a flat cutter seat thereon in a plane substantially alined with its longitudinal axis, means determinately to adjust the slide angularly about its longitudinal axis, and means to guide the slide for lengthwise reciprocating movement in its angularly adjusted position.

5. A device of the class described having, in combination, a grinding member, a bearing sleeve, a slide mounted in and guided by said sleeve for lengthwise reciprocating movement toward and from the grinding member and for turning movement angularly to adjust the slide about its longitudinal axis, and having a cutter seat thereon in a plane substantially alined with said axis, an arm extending from the slide and movable relative to the sleeve determinately to secure angular adjustment of the slide with means coöperating with said arm to maintain and guide the slide in its angularly adjusted position during lengthwise reciprocating movement.

6. A device of the class described having, in combination, a grinding member, a bearing sleeve, a slide mounted in and guided by said sleeve for lengthwise reciprocation toward and from the grinding member and for turning movement in the sleeve angularly to adjust the slide about its longitudinal axis, and having a cutter seat thereon in a plane substantially alined with its longitudinal axis, a pin guided on said bearing sleeve for lengthwise sliding movement, and an arm extending from said slide and movable angularly to adjust the slide, with means for detachably engaging said arm with said pin in a plurality of determinate angularly adjusted positions of the slide.

7. A device of the class described having, in combination, a grinding member, a bearing sleeve adjustably positioned in substantial alinement with said grinding member, a slide supported in and guided by said sleeve for lengthwise reciprocating movement toward and from said grinding member and for turning movement angularly to adjust the slide about its longitudinal axis, said slide having a cutter seat thereon substantially alined with said longitudinal axis, means arranged to clamp the slide against turning movement in said sleeve and to guide the slide for lengthwise reciprocation in angularly adjusted position, and to release the slide for turning movement, and an arm extending radially from the slide and movable relatively to said sleeve and clamping means determinately to turn the slide in its sleeve to secure a desired angular adjustment, with means detachably to connect the adjusted arm with the slide clamping and guiding means.

8. A device of the class described having, in combination, a grinder, a cutter-carrying member supported adjacent to said grinder and having a flat cutter seat thereon inclined relatively to the longitudinal axis of said member with a cutter receiving pin of uniform diameter upstanding from said seat substantially perpendicular to the longitudinal axis of said member, and means to effect relative movement of the grinder and cutter-carrying member in a direction to engage a supported cutter with the grinder.

9. A device of the class described, having, in combination, a grinder, a slide supported to move toward and from the grinder and having a flat cutter seat thereon inclined relatively to the longitudinal axis of the slide with a cutter receiving pin of uniform diameter upstanding from said seat and substantially perpendicular to said longitudinal axis.

10. A device of the class described having, in combination, a grinder, a slide supported for reciprocating movement toward and from the grinder and having a flat cutter seat thereon inclined relatively to the longitudinal axis of the slide with a pin upstanding from said seat to extend through the tapering bore of a cutter positioned on said seat, the diameter of said pin at its lower end coinciding with the diameter of the cutter bore at the end face of the cutter resting on said seat.

11. In a device of the class described, the combination with a grinding member, of a guide member, a cutter support movable along the guide member toward and from the grinding member and angularly about said guide member, means to secure determinate angular adjustment of the cutter support on the guide member, and means to maintain such adjustment during the movement of the cutter support along the guide member.

In testimony whereof I have signed my name to this specification.

ALBERT LATHAM.

Copies of this patent may be obtained for five cents each, by addressing the "Commissioner of Patents, Washington, D. C."